(12) United States Patent
Finke et al.

(10) Patent No.: US 11,028,905 B2
(45) Date of Patent: Jun. 8, 2021

(54) COUPLED PLANETARY GEARBOX

(71) Applicant: Hamilton Sundstrand Corporation, Charlotte, NC (US)

(72) Inventors: Aaron M. Finke, Janesville, WI (US); Stephen Michael Bortoli, Roscoe, IL (US); Mark J. Franklin, Janesville, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 81 days.

(21) Appl. No.: 16/353,413

(22) Filed: Mar. 14, 2019

(65) Prior Publication Data
US 2020/0292032 A1   Sep. 17, 2020

(51) Int. Cl.
*F16H 3/66* (2006.01)
*F02C 7/32* (2006.01)

(52) U.S. Cl.
CPC ............... *F16H 3/66* (2013.01); *F02C 7/32* (2013.01); *F05D 2260/40311* (2013.01); *F16H 2200/0043* (2013.01); *F16H 2200/2007* (2013.01); *F16H 2200/2041* (2013.01)

(58) Field of Classification Search
CPC ....... F16H 3/66–666; F16H 2200/0043; F16H 2200/2007; F16H 2200/2041; F02C 7/32; F05D 2260/40311
See application file for complete search history.

(56) References Cited

U.S. PATENT DOCUMENTS

| 4,869,128 A | * | 9/1989 | Ohkubo | F16H 3/66 |
| | | | | 475/41 |
| 4,944,719 A | * | 7/1990 | Takahashi | F16H 3/663 |
| | | | | 475/281 |

(Continued)

FOREIGN PATENT DOCUMENTS

| DE | 102014204795 A1 * | 9/2015 | ............... B60K 6/48 |
| EP | 0524791 B1 | 1/1993 | |

(Continued)

OTHER PUBLICATIONS

Extended European Search Report; Application No. 19209965.3; dated Jun. 22, 2020; 8 pages.

*Primary Examiner* — Ernesto A Suarez
*Assistant Examiner* — James J Taylor, II
(74) *Attorney, Agent, or Firm* — Cantor Colburn LLP

(57) ABSTRACT

Disclosed is a transmission, including: an input shaft; an output shaft; a gear system connected between the input shaft and the output shaft, the gear system including: a first epicyclical gear set that includes a first ring gear coupled to the input shaft, a first sun gear, a first planetary gear set, and a first planetary carrier connected to the first planetary gear set; and a second epicyclical gear set that includes a second ring gear, a second sun gear, a second planetary gear set, and a second planetary carrier connected to the second planetary gear set, wherein: the input shaft is coupled to the first ring gear and the second planetary carrier; and the first planetary carrier is coupled to the second ring gear; and clutches that engage the first epicyclical gear set and the second epicy- (Continued)

clical gear set, the clutches shifting the transmission to generate overlapping transmission speeds.

8 Claims, 13 Drawing Sheets

(56) References Cited

U.S. PATENT DOCUMENTS

| | | | |
|---|---|---|---|
| 5,180,346 A * | 1/1993 | Carriere | B60K 17/06 |
| | | | 475/198 |
| 5,358,458 A * | 10/1994 | Hicks | F16H 3/66 |
| | | | 475/269 |
| 5,643,124 A * | 7/1997 | Sugiyama | F16H 61/0437 |
| | | | 475/123 |
| 5,967,936 A * | 10/1999 | Kim | F16H 3/66 |
| | | | 475/269 |
| 7,481,062 B2 | 1/2009 | Gaines et al. | |
| 7,942,079 B2 | 5/2011 | Russ | |
| 8,262,535 B2 | 9/2012 | Klingels | |
| 8,721,491 B2 * | 5/2014 | Wittkopp | B60K 6/48 |
| | | | 475/280 |
| 8,876,650 B2 | 11/2014 | Lemmers, Jr. | |
| 9,908,397 B2 * | 3/2018 | Cho | B60K 6/547 |
| 10,479,365 B2 * | 11/2019 | Nishimura | B60K 6/365 |
| 10,591,038 B2 * | 3/2020 | Cronin | F16H 47/04 |
| 2002/0183154 A1 | 12/2002 | Ziemer | |
| 2017/0248081 A1 | 8/2017 | Roach et al. | |
| 2018/0149091 A1 | 5/2018 | Howell et al. | |
| 2018/0209513 A1 | 7/2018 | Lemmers, Jr. | |
| 2019/0024582 A1 | 1/2019 | Poulin | |

FOREIGN PATENT DOCUMENTS

| | | |
|---|---|---|
| EP | 2955418 B1 | 12/2015 |
| WO | 2008044972 A1 | 4/2008 |

* cited by examiner

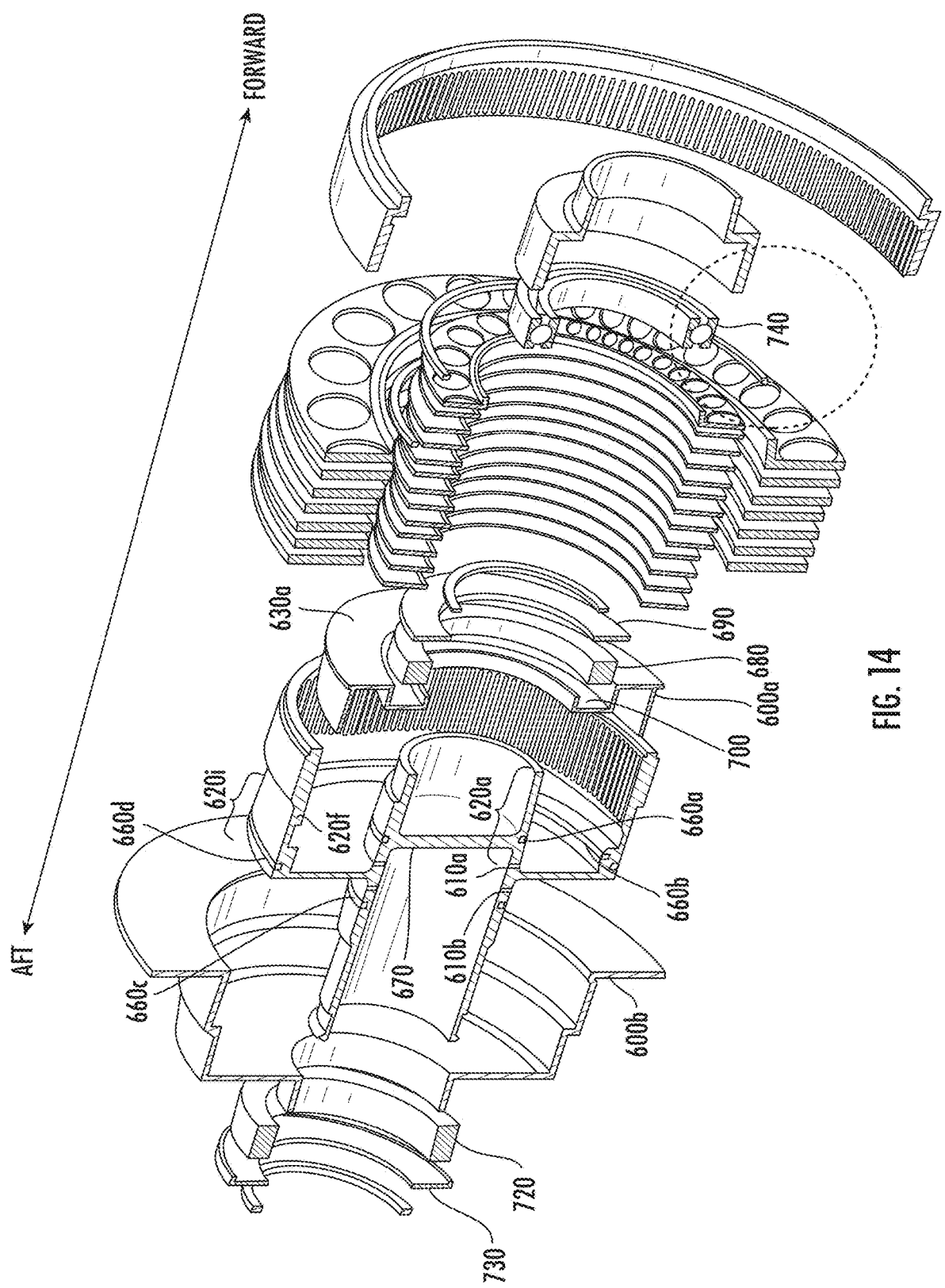

COUPLED PLANETARY GEARBOX

BACKGROUND

This application relates to a speed gearbox and more particularly to a coupled planetary gearbox driven for an aircraft system.

An increasing number of aircraft require significant electric power for operation. Various components may be driven by a high pressure spool through a power takeoff shaft. Due to modern aircraft engine efficiency requirements, electric power demand may be increasing beyond the power extraction potential of the engine high pressure spool.

BRIEF SUMMARY

Disclosed is a transmission, including: an input shaft configured to operationally connect to a low pressure section of a gas turbine engine; an output shaft configured to drive an engine an aircraft accessory; a gear system connected between the input shaft and the output shaft, the gear system including: a first epicyclical gear set that includes a first ring gear coupled to the input shaft, a first sun gear, a first planetary gear set, and a first planetary carrier connected to the first planetary gear set; and a second epicyclical gear set that includes a second ring gear, a second sun gear, a second planetary gear set, and a second planetary carrier connected to the second planetary gear set, wherein: the input shaft is coupled to the first ring gear and the second planetary carrier; and the first planetary carrier is coupled to the second ring gear; and a plurality of clutches that engage the first epicyclical gear set and the second epicyclical gear set, the plurality of clutches being adapted for shifting the transmission to generate a plurality of respectively overlapping transmission speeds.

In addition to one or more of the above features or as an alternate, the plurality of clutches comprises: a first clutch configured for being shifted between: a closed state, to rotationally couple the output shaft with the second sun gear; and an opened state to rotationally decouple the output shaft from the second sun gear; a second clutch configured for being shifted between: a closed state to rotationally couple the output shaft with the second ring gear and the first planetary carrier; and an opened state to rotationally decouple the output shaft from the second ring gear and the first planetary carrier; a third clutch configured for being shifted between: a closed state to rotationally brake the first sun gear; and an opened state to rotationally release from braking the first sun gear; and a fourth clutch configured for being shifted between: a closed state to rotationally brake the second ring gear and the first planetary carrier; and an opened state to rotationally release from braking the second ring gear and the first planetary carrier.

In addition to one or more of the above features or as an alternate, for each of the plurality of transmission speeds, the output shaft is configured to be engaged by: shifting the first clutch to the closed state; and/or shifting the second clutch to the closed state.

In addition to one or more of the above features or as an alternate, for each of the plurality of transmission speeds: two of the plurality of clutches are opened; and another two of the plurality of clutches are closed.

In addition to one or more of the above features or as an alternate: for each of the plurality of transmission speeds: at least one of the first clutch and the second clutch is in the closed state; and at least one of the third clutch and the fourth clutch is in the opened state; and for at least one of the plurality of transmission speeds: both of the first clutch and second clutch are in the closed state.

In addition to one or more of the above features or as an alternate, the plurality of transmission speeds include a first transmission speed, wherein: the first clutch is in the closed state; the second clutch is in the opened state; the third clutch is in the opened state; and the fourth clutch is in the closed state.

In addition to one or more of the above features or as an alternate, the plurality of transmission speeds include a second transmission speed, wherein: the first clutch is in the closed state; the second clutch is in the opened state; the third clutch is in the closed state; and the fourth clutch is in the opened state.

In addition to one or more of the above features or as an alternate, the plurality of transmission speeds include a third transmission speed, wherein: the first clutch is in the closed state; the second clutch is in the closed state; the third clutch is in the opened state; and the fourth clutch is in the opened state.

In addition to one or more of the above features or as an alternate, the plurality of transmission speeds include a fourth transmission speed, wherein: the first clutch is in the opened state; the second clutch is in the closed state; the third clutch is in the closed state; and the fourth clutch is in the opened state.

In addition to one or more of the above features or as an alternate: the first transmission speed and the second transmission speed overlap by a first overlapping speed range; the second transmission speed and the third transmission speed overlap by a second overlapping speed range that is broader than three times the first overlapping speed range; and the third transmission speed and the fourth transmission speed overlap by a third overlapping speed range that is broader than five times the first overlapping speed range.

In addition to one or more of the above features or as an alternate: the first transmission speed generates a first output/input speed ratio; the second transmission speed generates a second output/input speed ratio that is less than sixty percent of the first output/input speed ratio; the third transmission speed generates a third output/input speed ratio that is less than the second output/input speed ratio and less than forty percent of the first output/input ratio; and the fourth transmission speed generates a fourth output/input speed ratio that is less than the third output/input speed ratio and less than thirty percent of the first output/input ratio.

In addition to one or more of the above features or as an alternate: a first spline that connects: the first clutch to the second sun gear; and the first clutch to the output shaft; and a second spline that connects: the second clutch to the second ring gear; and the second clutch to the output shaft.

In addition to one or more of the above features or as an alternate: a first rotor coupled to the second sun gear, and the first rotor being a stub shaft that is: axially aligned with the input shaft and the output shaft; and axially intermediate the input shaft and the output shaft; wherein the first clutch is coupled to the first rotor so that engaging the first clutch engages the first rotor; a second rotor coupled to the first sun gear; wherein the third clutch is a first band brake configured to engage the second rotor; and the fourth clutch is a second band brake configured to engage the second ring gear.

Disclosed is a method of transmitting rotational speed, comprising: providing a first epicyclical gear set that includes a first sun gear, a first ring gear surrounding the first sun gear, a first planetary gear set that mechanically couples the first sun gear to the first ring gear, and a first planetary carrier connected to the first planetary gear set; providing a second epicyclical gear set that includes a second sun gear, a second ring gear surrounding the second sun gear, a second planetary gear set that mechanically couples the second sun gear to the second ring gear, and a second planetary carrier connected to the second planetary gear set; driving from an input shaft of the transmission: the first ring gear, thereby driving the first planetary gear set, and the first planetary carrier; and the second planetary carrier, thereby driving the second planetary gear set, and the second sun gear; driving, from the first planetary carrier, the second ring gear; and controlling a plurality of clutches in the transmission to engage the first epicyclical gear set and the second epicyclical gear set, thereby shifting the transmission between a plurality of transmission speeds that are respectively overlapping.

In addition to one or more of the above features or as an alternate, wherein controlling the plurality of clutches includes one or more of: shifting a first clutch of the plurality of clutches between: a closed state, to rotationally couple the output shaft with the second sun gear; and an opened state to rotationally decouple the output shaft from the second sun gear; shifting a second clutch of the plurality of clutches between: a closed state to rotationally couple the output shaft with the second ring gear and the first planetary carrier; and an opened state to rotationally decouple the output shaft from the second ring gear and the first planetary carrier; shifting a third clutch of the plurality of clutches between: a closed state to rotationally brake the first sun gear; and an opened state to rotationally release from braking the first sun gear; shifting a fourth clutch of the plurality of clutches between: a closed state to rotationally brake the second ring gear and the first planetary carrier; and an opened state to rotationally release from braking the second ring gear and the first planetary carrier.

In addition to one or more of the above features or as an alternate, for each of the plurality of transmission speeds, controlling the plurality of clutches includes engaging the output shaft in parallel by: shifting the first clutch to the closed state; and shifting the second clutch to the closed state.

In addition to one or more of the above features or as an alternate, the method includes generating a first transmission speed of the plurality of transmission speeds by: shifting the first clutch to the closed state; shifting the second clutch to the opened state; shifting the third clutch to the opened state; and shifting the fourth clutch to the closed state.

In addition to one or more of the above features or as an alternate, the method includes generating a second transmission speed of the plurality of transmission speeds by: shifting the first clutch to the closed state; shifting the second clutch to the opened state; shifting the third clutch to the closed state; and shifting the fourth clutch to the opened state.

In addition to one or more of the above features or as an alternate, the method includes generating a third transmission speed of the plurality of transmission speeds by: shifting the first clutch to the closed state; shifting the second clutch to the closed state; shifting the third clutch to the opened state; and shifting the fourth clutch to the opened state.

In addition to one or more of the above features or as an alternate, the method includes generating a fourth transmission speed of the plurality of transmission speeds by: shifting the first clutch to the opened state; shifting the second clutch to the closed state; shifting the third clutch to the closed state; and shifting the fourth clutch to the opened state.

BRIEF DESCRIPTION OF THE DRAWINGS

The following descriptions should not be considered limiting in any way. With reference to the accompanying drawings, like elements are numbered alike:

FIG. 14 illustrates additional features including seals and return springs associated with operation of pistons and clutches of a transmission according to an embodiment.

DETAILED DESCRIPTION

A detailed description of one or more embodiments of the disclosed apparatus and method are presented herein by way of exemplification and not limitation with reference to the Figures.

Figure 1:
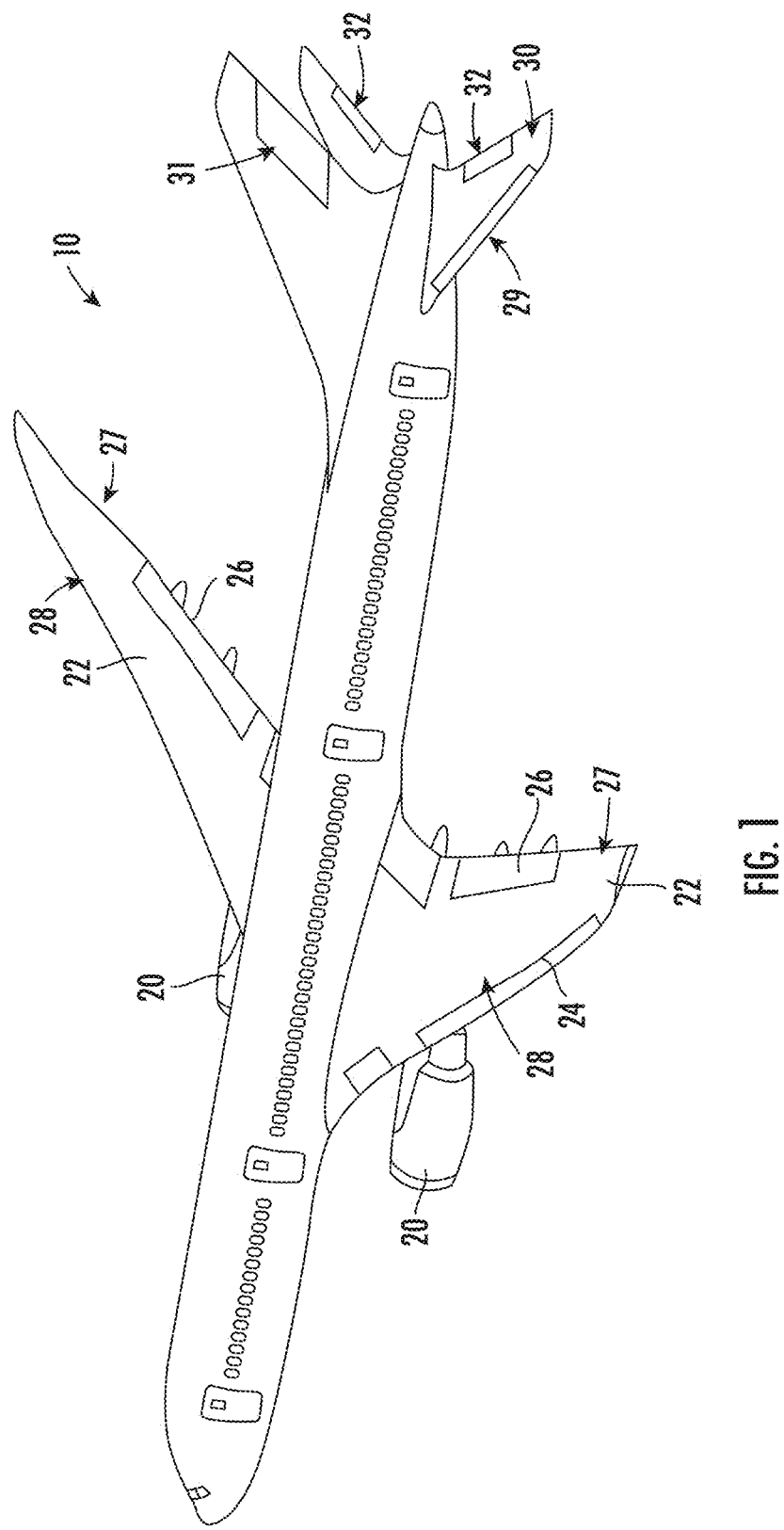
FIG. 1 is a perspective view of an aircraft that includes aerodynamic surfaces where embodiments of the present invention can be implemented.

FIG. 1 illustrates an example of a commercial aircraft 10 having aircraft engines surrounded by (or otherwise carried in) a nacelles 20. The aircraft 10 includes two wings 22 that can each include one or more slats 24 and one or more flaps 26. The aircraft may further include ailerons 27, spoilers 28, horizontal stabilizer trim tabs 29, horizontal stabilizer 30 and rudder 31, and vertical stabilizer 32 (the tail structure being collectively referred to as an and empennage) each of which may be typically referred to as "control surfaces" as they are movable under aircraft power systems. The leading edges of the wings and nacelles are especially vulnerable to the formation of ice.

Figure 2:
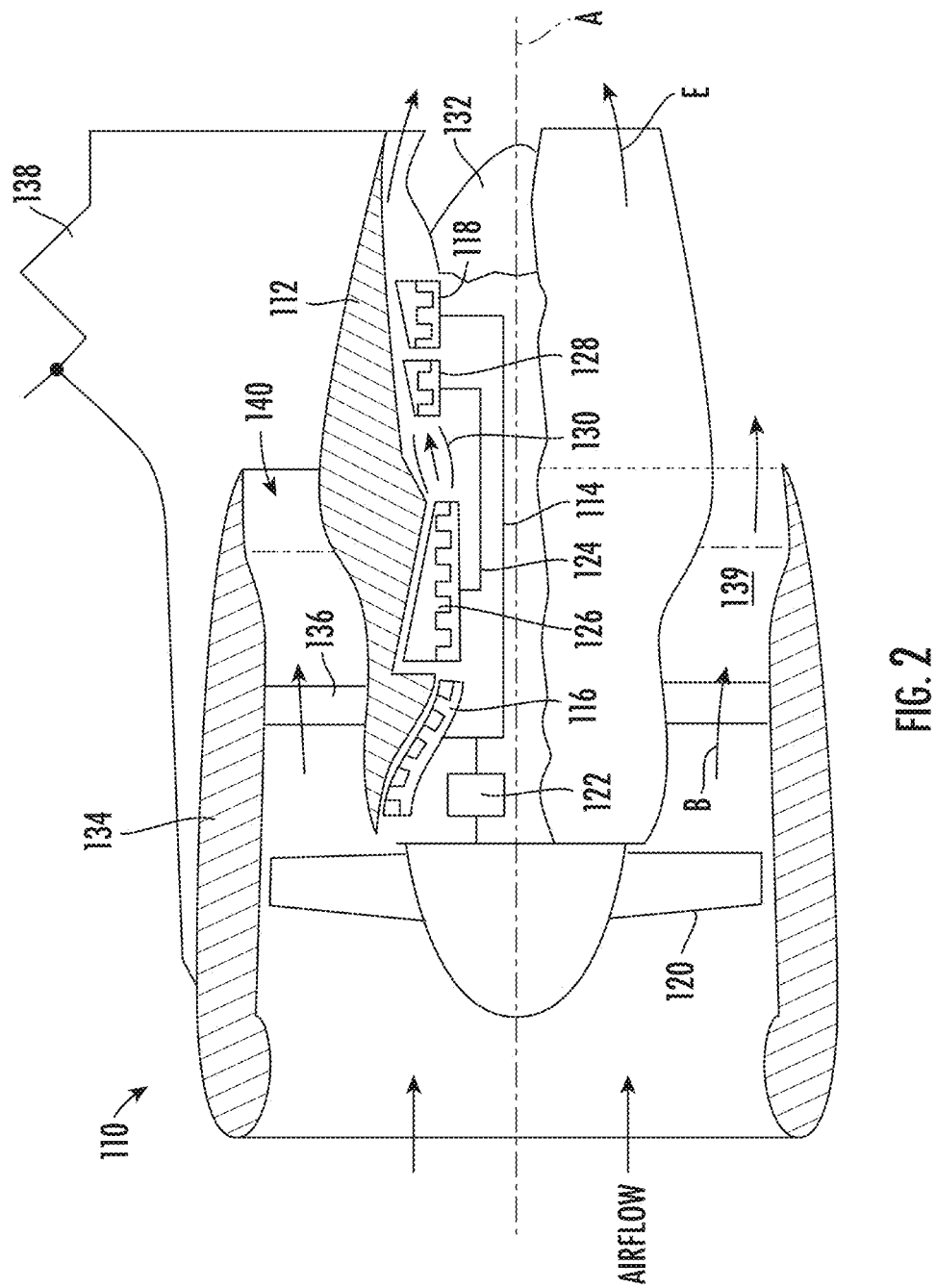
FIG. 2 illustrates a cross section of a gas turbine engine wherein embodiments of the present invention can be implemented.

A turbine 110 is shown in FIG. 2. A pylon 138 secures the engine 10 to an aircraft. The engine 110 includes a core nacelle 112 that houses a low pressure spool 114 (the low spool 114) and a high pressure spool 124 (the high spool 124) rotatable about an axis A. The low spool 114 supports a low pressure compressor 116 and low pressure turbine 118. In the example, the low spool 14 drives a turbofan 120 through a gear train 122. The high spool 124 supports a high pressure compressor 126 and high pressure turbine 128. A combustor 130 is arranged between the high pressure compressor 126 and high pressure turbine 128. Compressed air from compressors 116, 126 mixes with fuel from the combustor 130 and is expanded in turbines 118, 128. Airflow enters a fan nacelle 134, which surrounds the core nacelle 12 and turbofan 120. The turbofan 120 directs air into the core nacelle 112, which is used to drive the turbines 118, 128, as is known in the art. Turbine exhaust E exits the core nacelle 112 once it has been expanded in the turbines 118, 128, in a passage provided between the core nacelle and a tail cone 132. The core nacelle 112 is supported within the fan nacelle 134 by structure 136, which are commonly referred to as upper and lower bifurcations. A generally annular bypass flow path 139 is arranged between the core and fan nacelles 112, 134. The example illustrated in FIG. 2 depicts a high bypass flow arrangement in which approximately eighty percent of the airflow entering the fan nacelle 134 bypasses the core nacelle 112. The bypass flow B within the bypass flow path 139 exits the fan nacelle 134 through a nozzle exit area 140. For the engine 110 shown in FIG. 2, a significant amount of thrust may be provided by the bypass flow B due to the high bypass ratio. Thrust is a function of density, velocity and area. One or more of these parameters can be manipulated to vary the amount and direction of thrust provided by the bypass flow B. In one example, the engine 110 includes a structure associated with the nozzle exit area 40 to change the physical area and geometry to manipulate the thrust provided by the bypass flow B. However, it should be understood that the nozzle exit area might be effectively altered by other than structural changes, for example, by altering the boundary layer, which changes the flow velocity. Furthermore, it should be understood that any device used to effectively change the nozzle exit area is not limited to physical locations near the exit of the fan nacelle 134, but rather, includes altering the bypass flow B at any suitable location in the bypass flow path.

Figure 3:
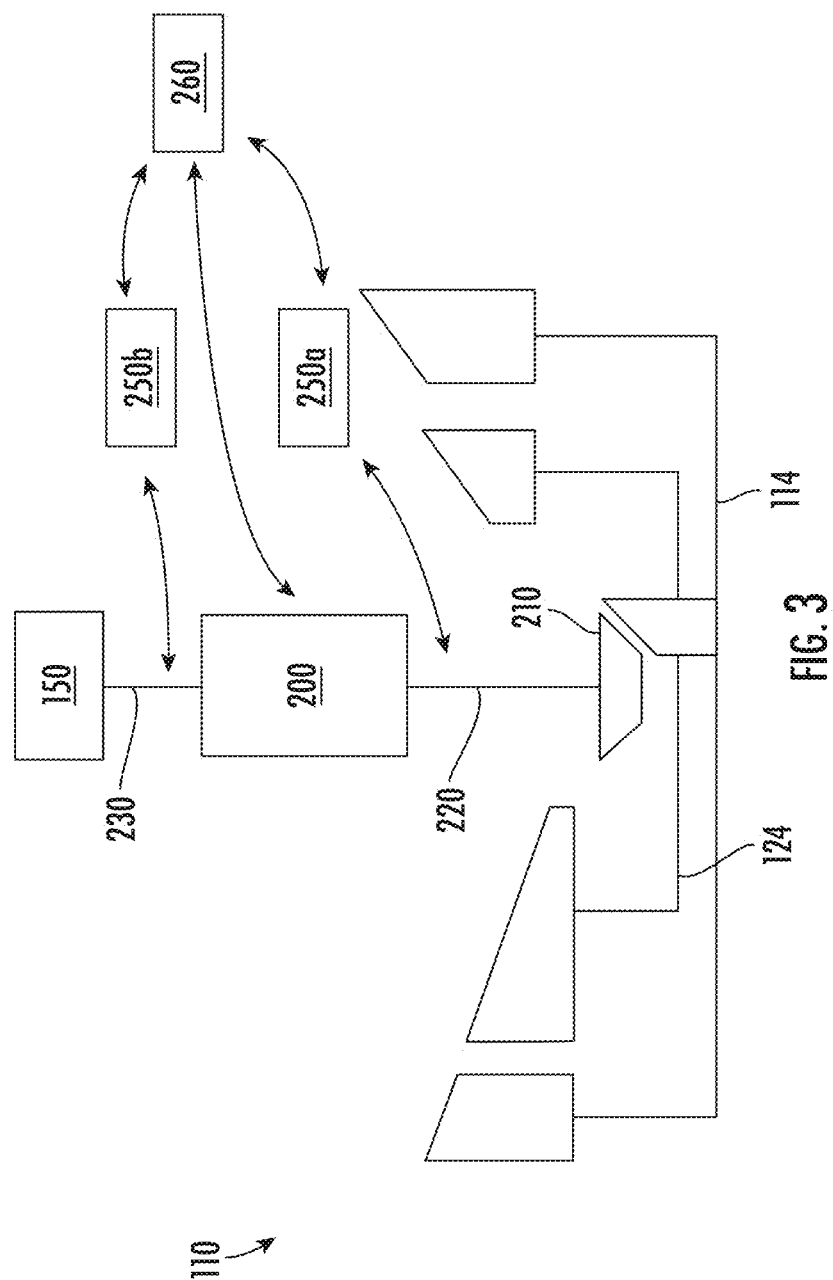
FIG. 3 schematically illustrates features of a gas turbine engine including a transmission transferring power between a low spool and an accessory according to an embodiment.

As illustrated in FIG. 3, according to the disclosure, energy to power one or more accessories 150 may be obtained from the low spool 114 through an intermediate transmission 200. The transmission 200 may be connected to the engine 110 by one or more bevel gears 210 and through a shaft 220 functioning as input shaft for the transmission 200. As shown a first bevel gear 210a is coupled to the low spool 114. The first bevel gear 210a meshes with and transfers rotational power to a second bevel gear 210b that is connected to the input shaft 220.

The accessories 150 may be powered by an output shaft 230 extending between the transmission 200 and the accessories 150. Extracting power from the low spool 124 may allow the high spool 114 to be made more efficient while also allowing for a lower idle speed which decreases brake wear. A difference in optimum speed ratios between accessories 150 and the low spool 114 may hinder an ability to extract power from the low spool 114. Optimum accessory speed ratio ranges may be approximately 2:1 while speed ratio ranges in the low spool 114 may be as high as 10:1. According to an embodiment, the transmission 200 disclosed herein may convert a large input speed ratio range (8:1) from the low spool 114 into a smaller output speed ratio range (2:1) for driving engine accessories 150. Speed sensors generally identified as 250, including a first speed sensor 250a on the input shaft 220 for the transmission and a second speed sensor 250b on the transmission output shaft 230, may communicate with a transmission controller 260 to initiate shifting though one or more clutches and one or more band brakes (disclosed in detail below). Overlapping ranges between the speed ratios may be provided to prevent "doorbelling" at the shift points. The disclosed transmission may convert a wide input speed range (8:1) into a narrower output speed range (2:1) for engine accessories 150.

Figure 4:
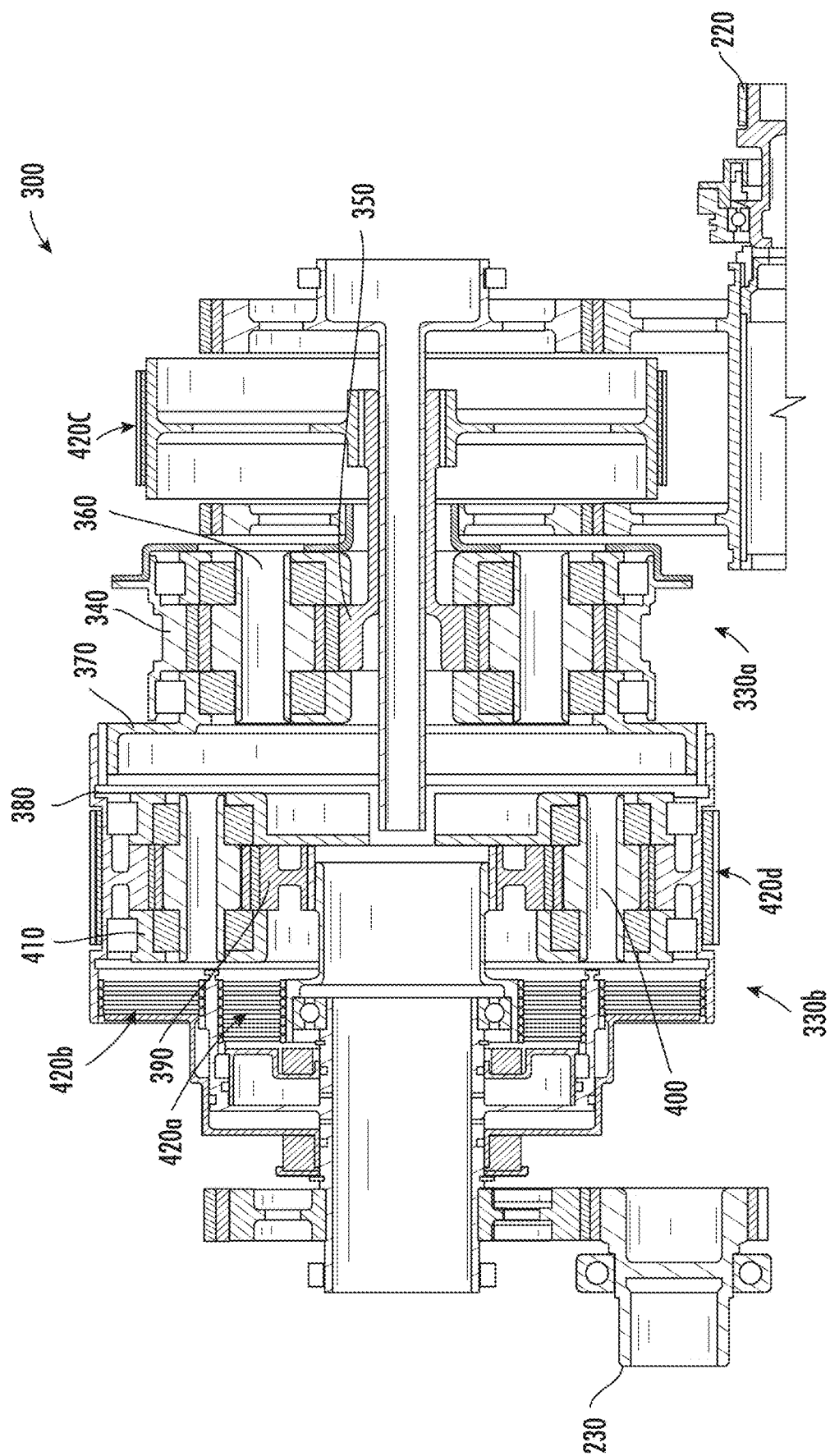
FIG. 4 illustrates features of a transmission according to an embodiment.

Turning to FIG. 4, disclosed in greater detail is the transmission 200. The transmission 200 may include the input shaft 220 configured to operationally connect to the low pressure section 114 of the gas turbine engine 110. The output shaft 230 may be configured to drive an aircraft accessory 150 (FIG. 3). A gear system generally referred to as 330 may be connected between the input shaft 220 and the output shaft 230.

The gear system 330 may include a first epicyclical gear set 330a (the first gear set 330a) and a second epicyclical gear set 330b (the second gear set 330b). The first gear set 330a may include a first ring gear 340, a first sun gear 350, a first planetary gear set 360, and a first planetary carrier 370 (the first carrier 370). The first carrier 370 may be connected to the first planetary gear set 360. The second gear set 330b may include a second ring gear 380, a second sun gear 390, a second planetary gear set 400, and a second planetary carrier 410 (the second carrier 410). The second carrier 410 may be connected to the second planetary gear set 400. The input shaft 220 may be coupled to the first ring gear 340 and the second carrier 410. In addition, the second ring gear 380 may be coupled to the first carrier 370. In addition, a plurality of clutches generally referred to as 420 may engage the first gear set 330a and the second gear set 330b. The plurality of clutches 420 may be adapted for shifting the transmission 200 to generate a plurality of respectively overlapping transmission speeds, discussed in greater detail below. In one embodiment, the second gear set 330b may be axially adjacent to the first gear set 330a.

The plurality of clutches 420 may comprise a first clutch 420a, a second clutch 420b, a third clutch 420c and a fourth clutch 420d. The first clutch 420a may be configured for being shifted by the engine controller 260 (FIG. 3) between a closed state and an opened state. In the closed state, the first clutch 420a may rotationally couple the output shaft 230 with the second sun gear 390. In the opened state, the first clutch 420a may rotationally decouple (not rotationally couple) the output shaft 230 from the second sun gear 390.

The second clutch 420b may be configured for being shifted between a closed state and an opened state. In the closed state, the second clutch 420b may rotationally couple the output shaft 230 with the second ring gear 380 and the first carrier 370. In the opened state, the second clutch 420b may rotationally decouple the output shaft 230 from the second ring gear 380 and the first carrier 370.

The third clutch 420c may be configured for being shifted between a closed state and an opened state. In the closed state, the third clutch 420c may rotationally brake (prevent rotation of) the first sun gear 350. In the opened state, the third clutch 420c may rotationally release from braking (not prevent rotation of) the first sun gear 350.

The fourth clutch 420d may be configured for being shifted between a closed state and an opened state. In the closed state, the fourth clutch 420d may rotationally brake the second ring gear 380 and the first carrier 370. In the opened state, the fourth clutch 420d may rotationally release from braking the second ring gear 380 and the first carrier 370.

Figure 5:
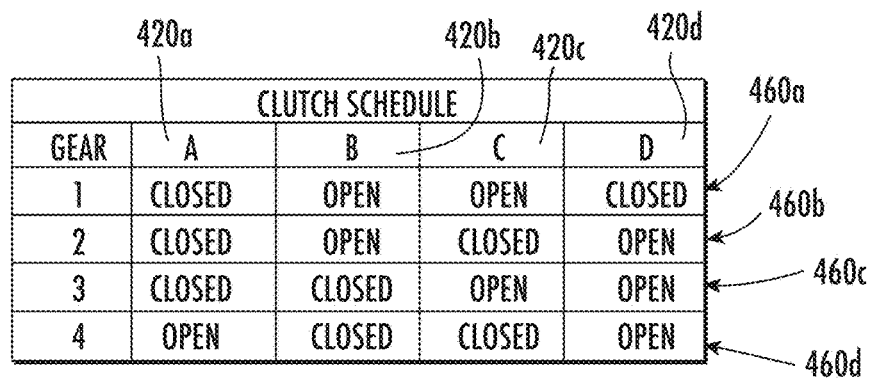
FIG. 5 lists a clutch schedule for providing different transmission speeds for a disclosed transmission according to an embodiment.
Figure 6:
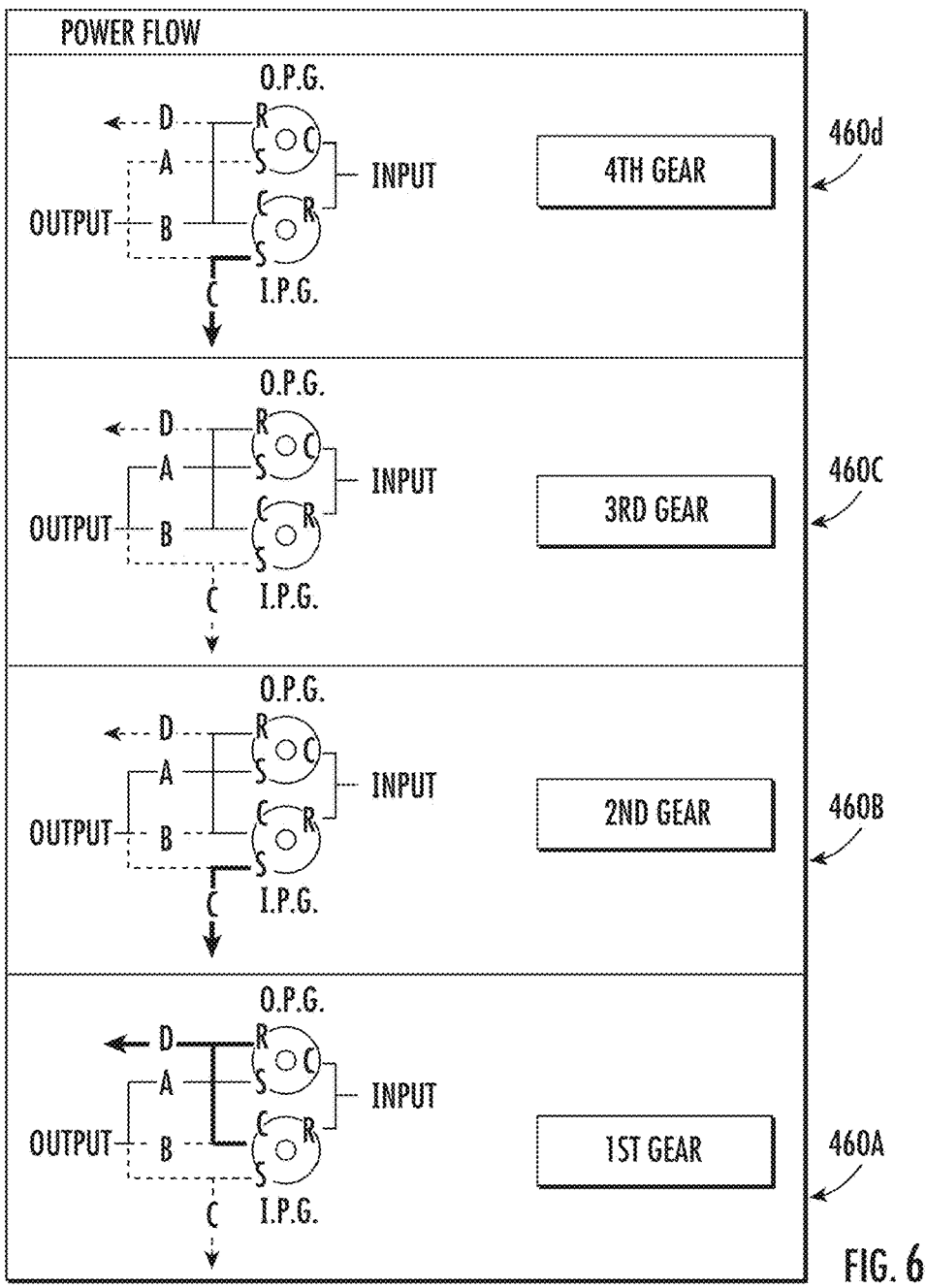
FIG. 6 schematically illustrates an implementation of a clutch schedule for providing different transmission speeds for a disclosed transmission according to an embodiment.

Turning to FIGS. 5 and 6, the plurality of transmission speeds are generally referred to as 460 and include a first transmission speed 460a, a second transmission speed 460b, a third transmission speed 460c and a fourth transmission speed 460d. For each of the transmission speeds 460, the clutches 420 may be configured for operating pursuant to a clutch schedule that is actuated, for example, by the engine controller 260 (FIG. 3). The clutches 420 are identified alphabetically in FIGS. 5 and 6, wherein "A" represents the first clutch 420a, "B" represents the second clutch 420b, "C" represents the third clutch 420c, and "D" represents the fourth clutch 420d. In addition, in FIG. 6, "IPG" represents the input (first) planetary gear system 330a, "OPG" represents output (second) planetary gear system 330b, "S" represents the sun gear (350 or 390) for respective gear system 330, "R" represents the ring gear (340 or 380) for respective gear system 330, and "C" represents the planetary carrier (370 or 410) for respective gear system 330.

For each of the plurality of transmission speeds 460, the output shaft 230 may be engaged to convert speed and power at the input shaft 220 to speed and power at the output shaft 230. Engaging the output shaft 230 may be achieved by shifting one or both of the first clutch 420a and the second clutch 420b to the closed state. In addition, for each of the transmission speeds 460, two of the plurality of clutches 420 may be opened and another two of the plurality of clutches 420 are closed. For each of the transmission speeds 460, at least one of the first clutch 420a and the second clutch 420b is in the closed state and at least one of the third clutch 420c and the fourth clutch 420d is in the opened state. In addition, for at least one of the transmission speeds 460, both of the first clutch 420a and the second clutch 420d are in the closed state.

As illustrated in FIG. 5, in the first transmission speed 460a, the first clutch 420a may be in the closed state and the second clutch 420b may be in the opened state. In addition, in the first transmission speed 460a, the third clutch 420c may be in the opened state, and the fourth clutch 420d may be in the closed state. From this configuration, power is directed from the input shaft 220 to the second carrier 410. The first carrier 370 and the second ring gear 380 are stopped from rotating by action of the fourth clutch 420d. Power travels from the second sun gear 390 to the output shaft 230 by action of the first clutch 420a.

In the second transmission speed 460b, the first clutch 420a may be in the closed state and the second clutch 420b may be in the opened state. In addition, in the second transmission speed 460b, the third clutch 420c may be in the closed state, and the fourth clutch 420d may be in the opened state. From this configuration, power is directed from the input shaft 220 to the first ring gear 340 and the second carrier 410. The first sun gear 350 is stopped from rotating by action of the third clutch 420c. The rotational speed of the first carrier 370 and the second ring gear 380 determines the speed of the second sun gear 390 which drives the output shaft 230 through the first clutch 420a.

Rotational speeds of the first carrier 370 and the second carrier 380 are also a function of the specific gear-tooth ratios of each of the gears in each gear set. However, the configuration of such specific gear-tooth ratios would be appreciated by one of ordinary skill in the art and are therefore not discussed in detail herein. The specific gear are not to be confused with the total gear ratios for the gear sets, which is disclosed in detail herein (below) with reference to FIG. 8.

In the third transmission speed 460d, the first clutch 420a may be in the closed state and the second clutch 420b may be in the closed state. In addition, in the third transmission speed 460c, the third clutch 420c may be in the opened state, and the fourth clutch 420d may be in the opened state. From this configuration, power is directed from the input shaft 220 to the first ring gear 340 and the second carrier 410. The first carrier 370 and the second ring gear 380 engage the output shaft 230 by action of the second clutch 420b. The second sun gear 390 engages the output shaft 230 by action of the first clutch 420a. By the principle of operation of an epicyclical gear set, a straight-thru condition is achieved whenever two components of the gear set are rotationally coupled. The action of the first clutch 420a and second clutch 420b rotationally couples the second sun gear 390 and the second ring gear 380 resulting in a straight-thru condition. Thus, the output shaft 230 is engaged by parallel action of the first clutch 420a and second clutch 420b.

In the fourth transmission speed 460d, the first clutch 420a may be in the opened state and the second clutch 420b may be in the closed state. In addition, in the fourth transmission speed 460c, the third clutch 420c may be in the closed state and the fourth clutch 420d may be in the opened state. From this configuration, power is directed from the input shaft 220 to the first ring gear 340 and the second carrier 410. The first sun gear 350 is stopped from rotating by action of the third clutch 420c. The first carrier 370 and the second ring gear 380 transfer power to the output shaft 230 by action of the second clutch 420b. As such, the second ring gear 380 functions as a second intermediate output shaft for the transmission 200.

Figure 7:
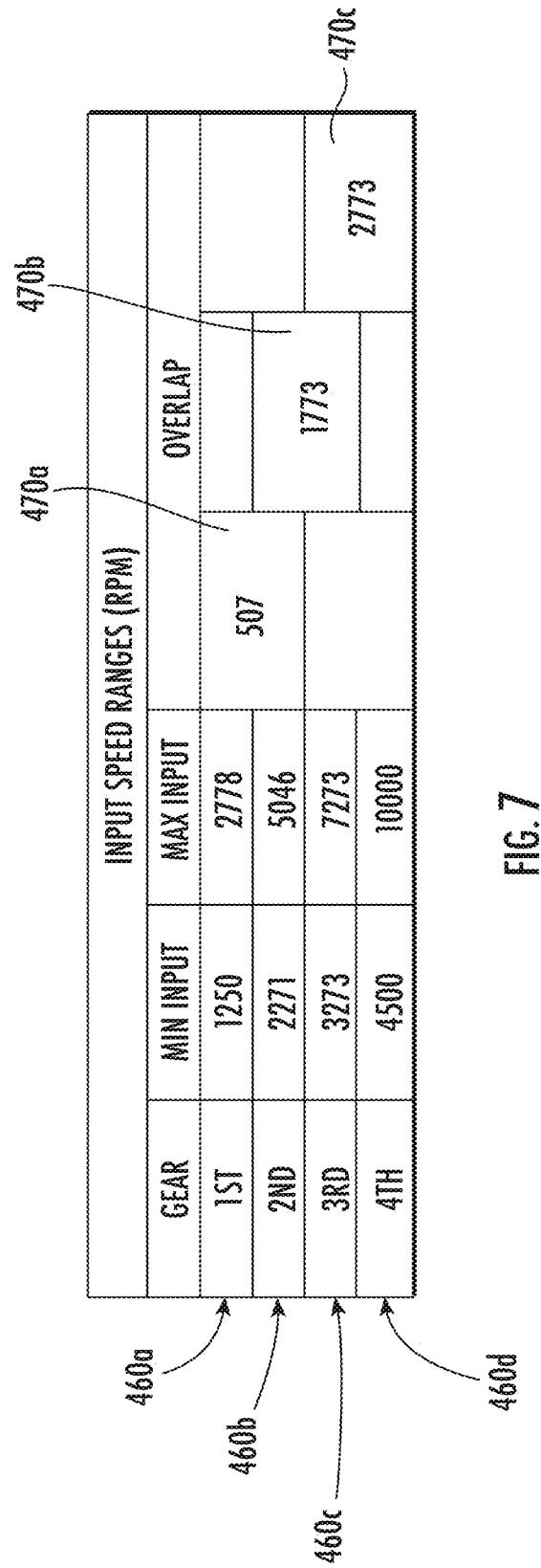
FIG. 7 lists overlapping speed ranges for different transmission speeds for a disclosed transmission according to an embodiment.

Turning to FIG. 7, the first transmission speed 460a and the second transmission speed 460b may overlap by a first overlapping speed range 470a. In addition, the second transmission speed and third transmission speed may overlap by a second overlapping speed range 470b. The second overlapping speed range may be broader than three times the first overlapping speed range. Further, the third transmission speed and the fourth transmission speed may overlap by a third overlapping speed range 470c. The third overlapping speed range may be broader than five times the first overlapping speed range.

As illustrated, in one embodiment, the minimum input and maximum input speeds for the first transmission speed 460a may be 1250 rpm (revolutions per minute) and 2778 rpm, respectively. The minimum input and maximum input speeds for the first transmission speed 460b may be 2271 rpm and 5046 rpm, respectively. The minimum input and maximum input speeds for the third transmission speed 460c may be 3273 rpm and 7273 rpm, respectively. The minimum input and maximum input speeds for the fourth transmission speed 460d may be 4500 rpm and 1000 rpm, respectively. The first speed range overlap 470a may be 507 rpm. The second speed range overlap 470b may be 1773 rpm. The third speed range overlap 470c may be 2773 rpm. These speed ranges and speed range overlaps given in FIG. 7 are for reference only and are not intended to be limiting.

Figure 8:
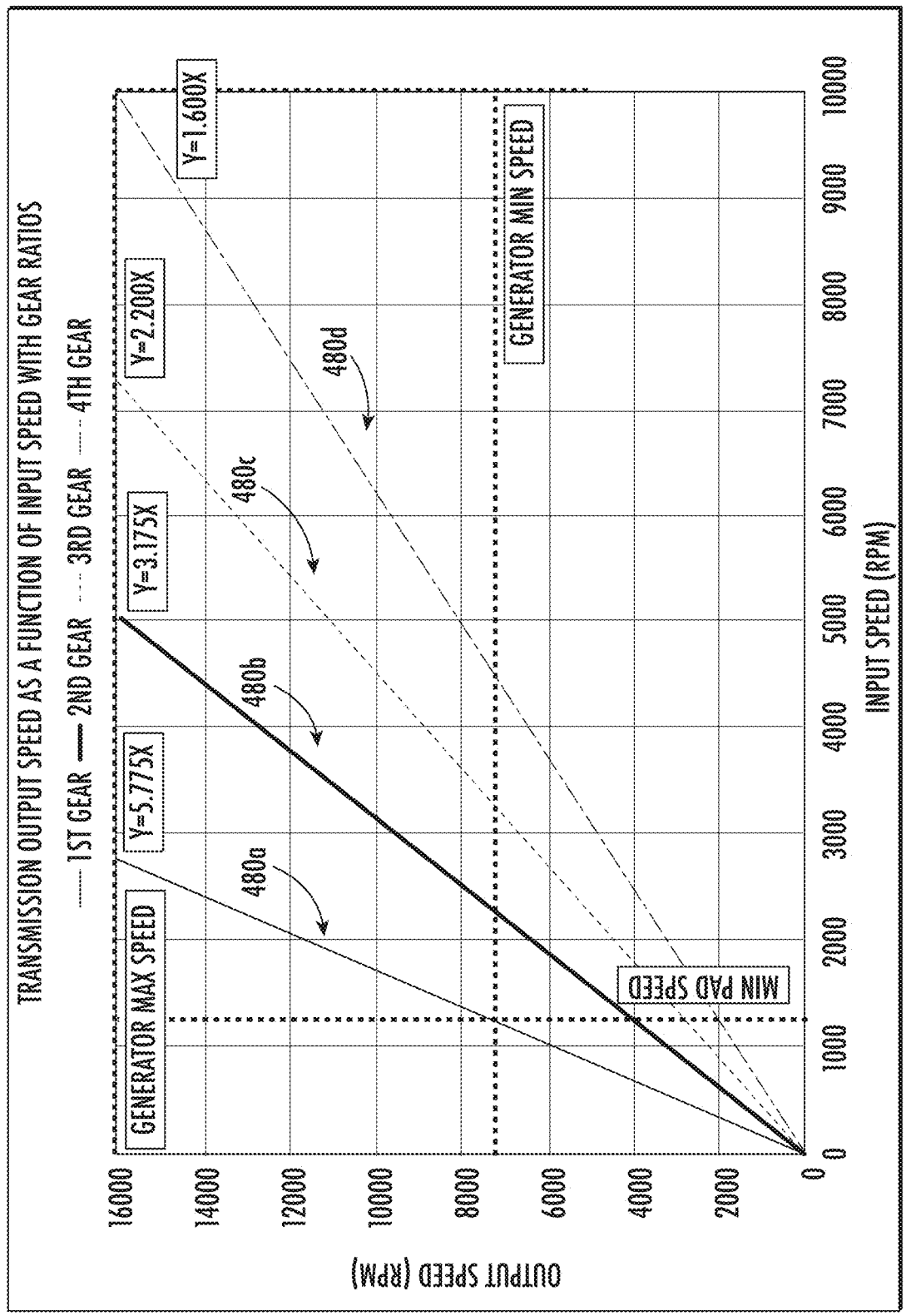
FIG. 8 is a graph of output/input ratios for different transmission speeds according to an embodiment.

Turning to FIG. 8, the first transmission speed 460a may generate a first output/input speed ratio 480a. In addition, the second transmission speed 460b may generate a second output/input speed ratio 480b. The second output/input speed ratio that may be less than sixty percent of the first output/input speed ratio 480a. The third transmission speed 460c may generate a third output/input speed ratio 480c. The third output/input speed ratio 480c may be less than the second output/input speed ratio 480b and less than forty percent of the first output/input ratio 480a. The fourth transmission speed 460d may generate a fourth output/input speed ratio 480d. The fourth output/input speed ratio 480d that may be less than the third output/input speed ratio 480c and less than thirty percent of the first output/input ratio 480a. As illustrated, the first output/input speed ratio 480a may follow an equation of Y=5.775X, which is a linear equation where X is the input speed and Y is the output speed. The second output/input speed ratio 480b may follow an equation of Y=3.175X. The third output/input speed ratio 480c may follow an equation of Y=1.600X.

As provided in the above disclosure, the first sun gear 350 and second ring gear 380 function as speed trimming gears to produce a desired gear ratio for their respective gear set 330a and 330b. By selectively braking these gears, 350 and 380, the output speed for the gear sets, 330a and 330b, may be determined. If the speed of gears 350 and 380 is not known, the output speed for the gear set 330a and 330b may be indeterminate. For example, in the first transmission speed 460a, the speed of the first carrier 370 and the second ring gear 380 is known, because these gears 370, 380 are not spinning (zero rpm). In this configuration, a speed of the second carrier 410 is known because its speed is a function of the speed of the input shaft 220. The speed of the second sun gear 390 and the speed of the output shaft 230 can then be calculated based on the input/output speed ratios 480 for the transmission 200.

Figure 9:
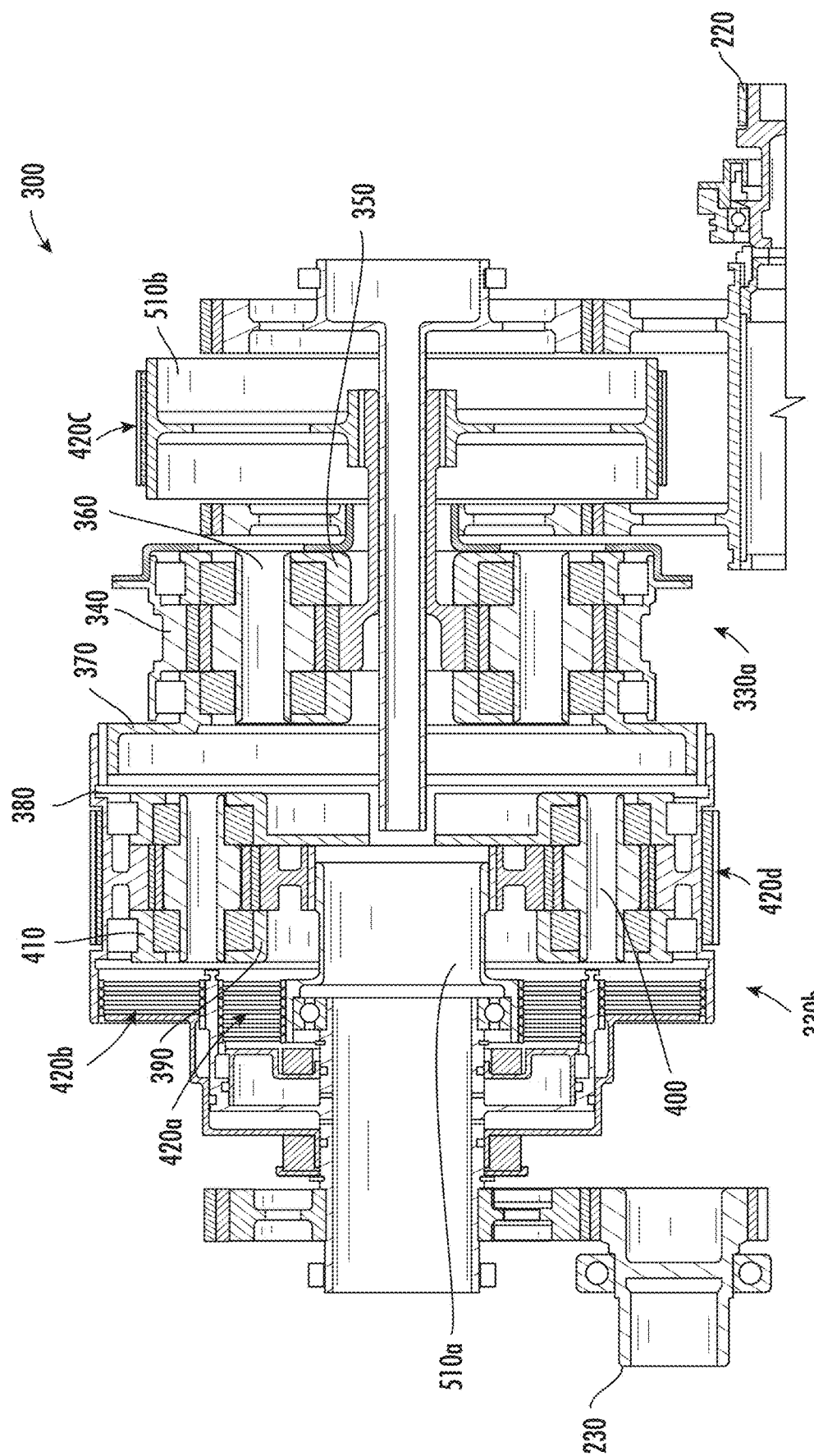
FIG. 9 illustrates additional features of a transmission according to an embodiment.

Turning to FIG. 9, the transmission 200 may include a plurality of rotors generally referred to as 510. The plurality of rotors may include a first rotor 510a and a second rotor 510b. The first rotor 510a may be coupled to the second sun gear 390 so that the first rotor 510a may function as a first intermediate output shaft for the transmission 200. The first rotor 510a may be a stub shaft that may be axially aligned with the input shaft 220 and the output shaft 230. The first rotor 510a may be axially intermediate the input shaft 220 and the output shaft 230. The first clutch 420a may be coupled to the first rotor 510a so that engaging the first clutch 420a may engage the first rotor 510a. The second rotor 510b may be coupled to the first sun gear 350. In addition, the third clutch 420c may be a first band brake that may be configured to engage the second rotor 510b. The fourth clutch 420d may be a second band brake that may be configured to engage the second ring gear 380.

Figure 10:
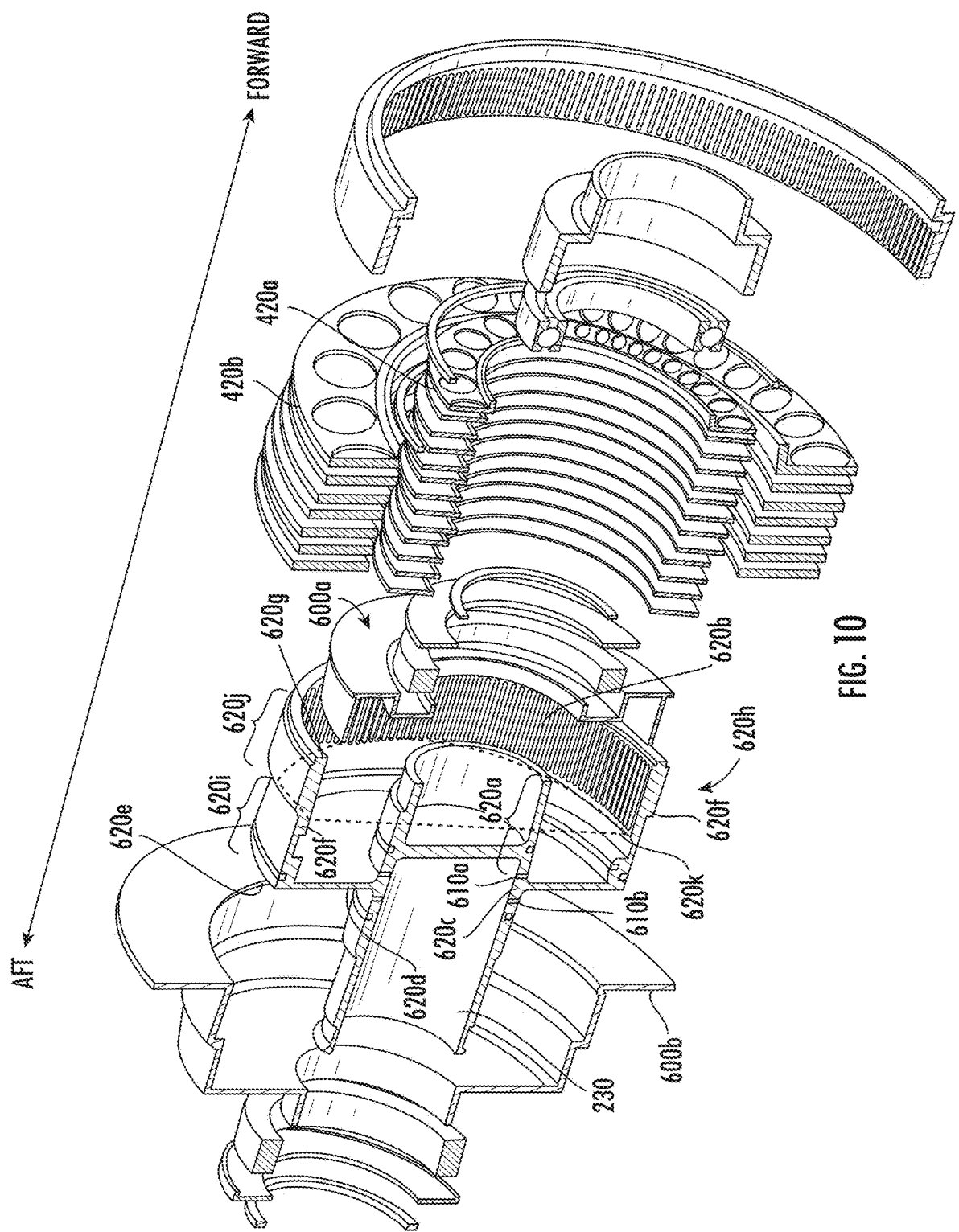
FIG. 10 illustrates additional features of an output shaft of a transmission according to an embodiment.

Turning to FIG. 10, further illustrated are the plurality of clutches 420 that are axially aligned and radially offset. The plurality of clutches 420, as indicated, are configured to engage in parallel the output shaft 230 and shift the transmission 200 to generate a plurality gear speeds. A plurality of pistons generally referred to as 600 may be configured to engage the respective plurality of clutches 420. The plurality of pistons 600 may be hydraulically controlled and adapted to receive fluid from a respective plurality of ports generally referred to as 610 in the output shaft 230.

The plurality of clutches 420 may include a first clutch 420a and a second clutch 420b. The plurality of pistons 600 may include a first piston 600a and a second piston 600b. The first piston 600a may engage the first clutch 420a and the second piston 600b may engage the second clutch 420b. The plurality of ports 610 in the output shaft may include a first port 610a and a second port 610b. The first port 610a may communicate fluid to the first piston 600a. The second port 610b may be axially aft of the first port 610a and may fluidly communicate fluid to the second piston 600b.

The output shaft 230 may include first plurality of segments generally referred to as 620, including a first segment 620a that extends forward to a first axial end 620b from a location 620c on the output shaft 230 that is between the plurality of ports 610. A second segment 620d may be radially extending to an aft end 620e of a third segment 620f.

The third segment 620f may extend axially forward and end at a second axial end 620g that is axially proximate the first axial end 620b. A first internal cavity 620h may be defined by the first plurality of segments 620 of the output shaft 230, with the first fluid port 610a being fluidly connected to the first internal cavity 620h. An axially aft portion 620i of the first internal cavity 620h may form a housing for the first piston 600a (the first piston housing 620i). An axially forward portion 620j of the internal cavity 620h may form a housing for the first clutch 420a (the first clutch housing 620j). The first piston housing 620i and the first clutch housing 620j are separated by phantom line 620k for illustrative purposes. The first clutch 420a is radially within the first clutch housing 620j. The second clutch 420b is radially exterior to the first clutch housing 620j.

Figure 11:
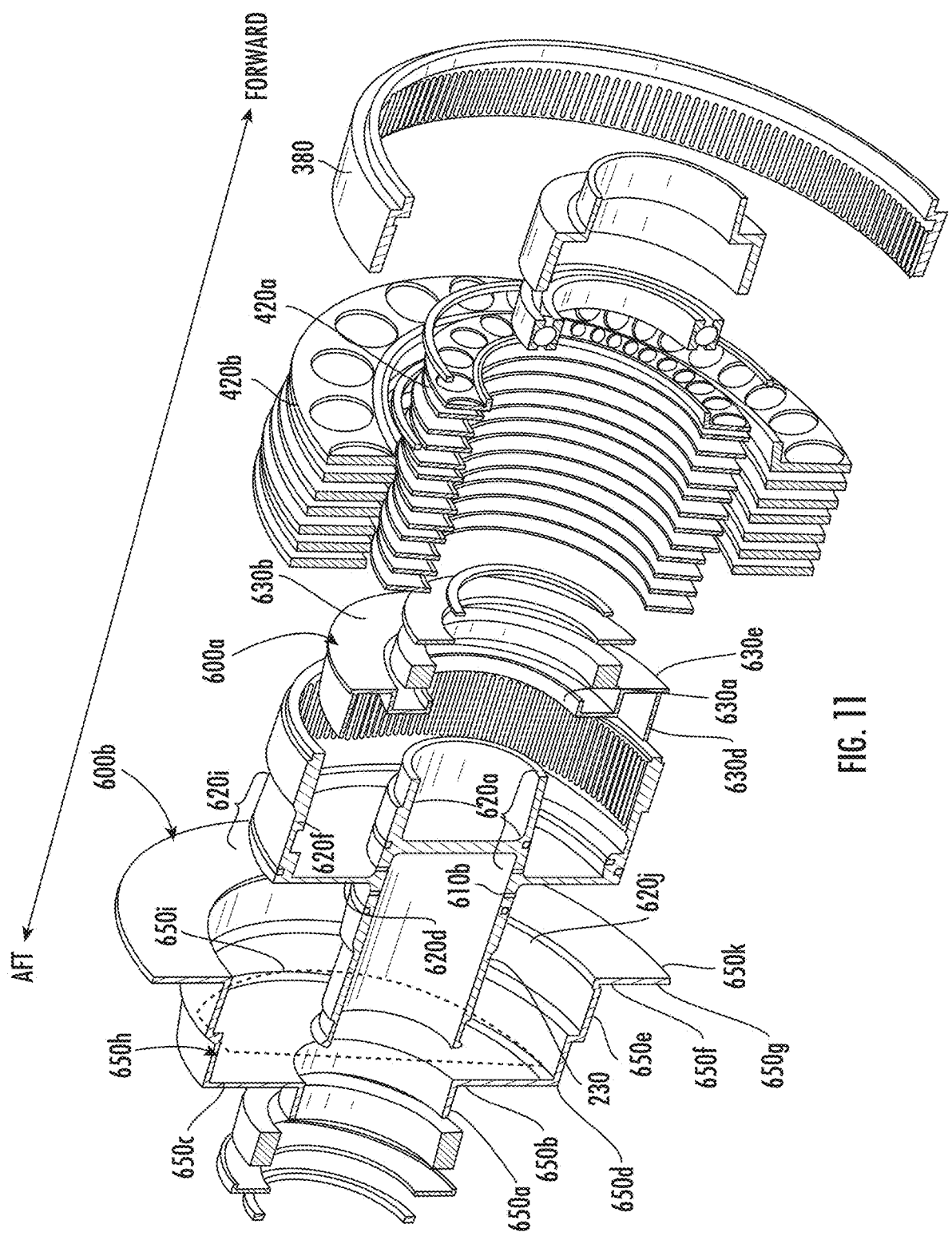
FIG. 11 illustrates additional features of pistons that engage clutches to engage an output shaft of a transmission according to an embodiment.

Turning to FIG. 11, the first piston 600a may be formed by a first slider shaft movably positioned within the first piston housing 620i. The first piston 600a may include a second plurality of segments generally referenced by 630, including a fourth segment 630a that is axially extending and configured to slide along the first segment 620a within the piston housing 630i. The fourth segment 630a may be sized so that during a full range of motion along the first segment 620a in the first piston housing 620i, the first port 610a remains in fluid communication with the first piston housing 620i. A fifth segment 630b may be radially outwardly extending and may be configured to press against the first clutch 420a. The fifth segment 630b may connect with a forward end 630c of a sixth segment 630d. The sixth segment 630d may extend axially aft by a span that is the same as the axial span of the first piston housing 630i. The sixth segment 630d may be configured to slide along the third member 620f within the piston housing 630i. In addition, a radially outward lip 630e extending from the fifth segment 630b engages the output shaft 230 to rotate with the output shaft 230. As illustrated, fluid action through the first port 610a moves the first piston 600a in forward and aft directions to engage and release the first clutch 420a.

The second piston 600b may be formed by a second slider shaft movably positioned between the output shaft 230 aft of the second segment 620d, and second intermediate output shaft 380. The second piston 600b includes a second plurality of segments generally referenced by 650, including a seventh segment 650a that is axially extending and configured to slide along the output shaft 230. Connected to a forward end 650b of the seventh segment 650a is an eighth segment 650c that is radially outwardly extending, parallel with the second segment 655d, and connects with an aft end 650d of a ninth segment 650e. The ninth segment 650e extends axially aft to at least partially slide against the third segment 630f of the output shaft 230. The ninth segment 650e extends axially aft to a radially inner end 650f of a tenth segment 650g. The tenth segment 650g extends axially to the second intermediate output shaft 380 and is configured to engage the second clutch 420b.

A second internal cavity 650h, identified forward of phantom line 650i in the second piston 600b, is formed between the second piston 600b and the output shaft 230. The second piston 600b is configured so that the second fluid port 610b remains in fluid communication with the second internal cavity 650h. Fluid action through the second port 610b moves the second piston 600b in forward and aft directions to engage and release the second clutch 420b. In addition, a radially inner lip 650j extending from the tenth member 650g engages the output shaft 230 to rotate with the output shaft 230. A radially outer lip 650k extending from the tenth member 650g engages with the second intermediate output shaft 380 to rotate with the second intermediate output shaft.

Figure 12:
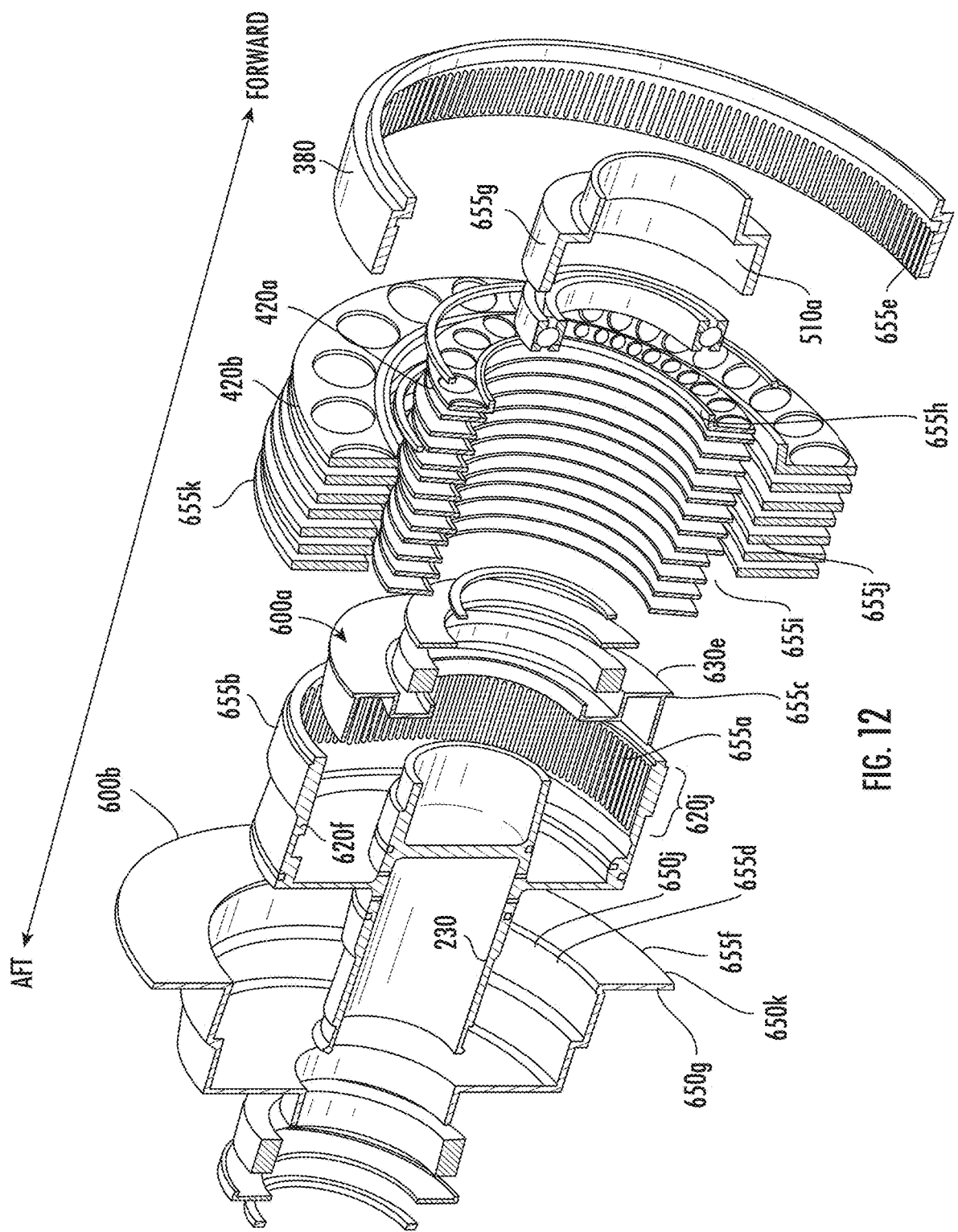
FIG. 12 illustrates additional features of splines that provide for coupled rotation between the output shaft, pistons and clutches of a transmission according to an embodiment.
Figure 13A:
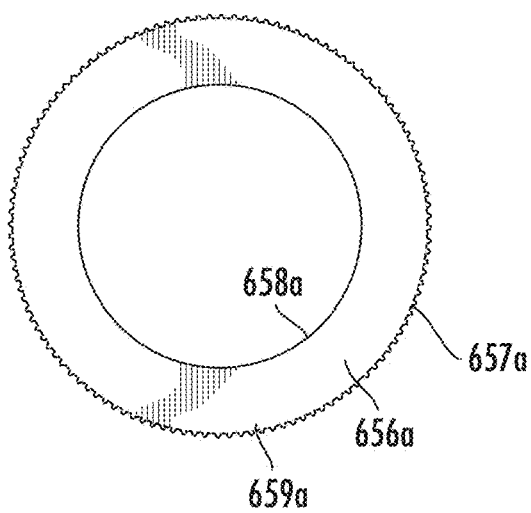
FIGS. 13A-13D illustrate clutch plates that may be utilized in clutches of a transmission according to an embodiment.
Figure 13B:
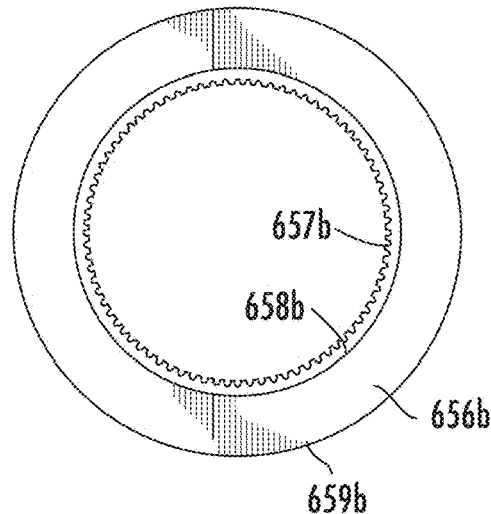
Figure 13C:
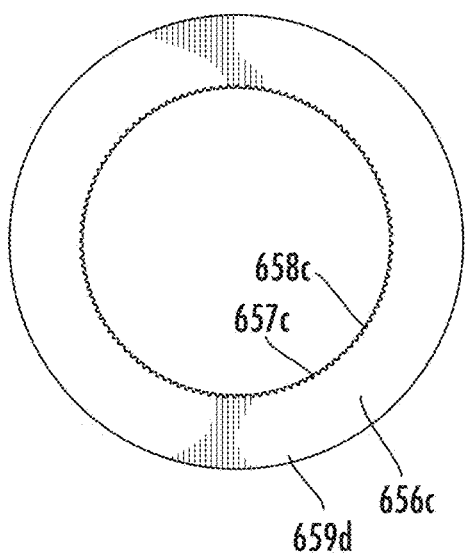
Figure 13D:
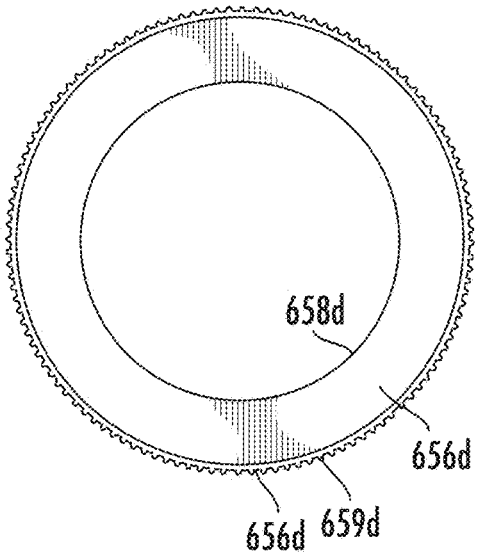

Turning to FIG. 12, the transmission 200 includes a plurality of splines generally referenced as 655. The first clutch housing 620j may include a first spline 655a that is a radially inner spline and a second spline 655b that is a radial outer spline. The first piston 600a may include a third spline 655c that is a radial outer spline configured to engage with the first spline 655a. The third spline 655c may extend from the radially extending lip 630e of the first piston 600a. The second piston 600b may include a fourth spline 655d that may be a radial inner spline configured to engage with the second spline 655b. The fourth spline 655d may extend from the radially extending lip 650j.

The second intermediate output shaft 380 may include a fifth spline 655e that may be a radially inner spline. The second piston 600b may include a sixth spline 655f that may be is radially outer spline configured to engage with the fifth spline 655e. The sixth spline 655f may extend from the radial extending lip 650k of the second piston 600b. The first intermediate output shaft 510a may have a seventh spline 655g that may be a radially outer spline. The first clutch 420a may include an eighth spline 655h that may be a radially inner spline configured to engage with the seventh spline 655g. A ninth spline 655i in the first clutch 420a may be is a radially outer spline configured to engage with the first spline 655a.

The second clutch 420b may include a tenth spline 655j that may be a radially inner spline configured to engage with the second spline 655b. In addition, an eleventh spline 655k may be provided in the second clutch 420b. The eleventh spline 655k may be a radially outer spline configured to engage with the second intermediate output shaft 380.

With the above configuration, each of the clutches 420 has an inner spline and an outer spline. This is achieved by utilizing a clutch pack with alternating discs generally referred to as 656 having splines facing alternating radial directions. For example, as illustrated in FIGS. 13a-13d, respectively, the first clutch 420a may have an inner clutch separator plate 656a and an inner clutch friction plate 656b. The second clutch 420b may have an inner clutch separator plate 656c and an inner clutch friction plate 656d. Each of the discs 656 has a series of spline teeth generally referred to as 657 on an inner diameter edge generally referred to as 658 or an outer diameter edge generally referred to as 659. Specifically, in the first clutch 420a, the inner clutch separator plate 656a has spline teeth 657a on the outer diameter edge 659a and the inner clutch friction plate 656b has spline teeth 657b on the inner diameter edge 658b. In the second clutch 420b, the inner clutch separator plate 656c has spline teeth 657c on the inner diameter edge 658c and the inner clutch friction plate 656d has spline teeth 657d on the outer diameter edge 659d. These relationships are not meant to be limiting.

Turning back to FIG. 12, when the clutches 420 are not engaged, the alternating discs in each clutch pack rotate freely relative to each other. When the clutches 420 are engaged, then the clutch packs rotate in unison. Thus, for example, the first clutch 420a, when engaged, will cause the first intermediate out shaft 510a to rotate with the output shaft 230. Otherwise the first intimidate output shaft 510a rotates freely relative to the output shaft 230. The second clutch 420b, when engaged, will cause the second intermediate output shaft 380 to rotate with the output shaft 230. Otherwise the second intimidate output shaft 380 rotates freely relative to the output shaft 230.

Turning to FIG. 14, a plurality of seals generally identified as 660 may be provided. The seals 600 may include a first seal 660a and a second seal 660b in the first piston housing 620a and engage the first piston 600a to fluidly constrain fluid flowing to the first piston 600a from the first fluid port 610a. The first seal 660a may be an axially forward seal located between the first piston 600a and the first segment 620a of the output shaft 230. The second seal 660b may be an axially aft seal located between the first piston 600a and the third segment 620f of the output shaft 230.

A third seal 660c and a fourth seal 660d may engage the second piston 600b to fluidly constrain fluid flowing to the second piston 600b from the second fluid port 610b. The third seal 660c may be an axially forward seal located between the second piston 600b and the output shaft 230. The fourth seal 660d may be an axially aft seal located between the second piston 600b and the third segment 620f of the output shaft 230. The output shaft 230 may include an internal annulus 670, disposed forward of the plurality of ports 610. The internal annulus 670 may be configured to seal fluid within the output shaft 230 from flowing forward thereof.

A first piston return spring 680 may be disposed axially between the first piston 600a and an annulus 690 fixed to the output shaft 230, wherein the annulus 690 may be axially forward of the first piston 600a. The first piston return spring 680 may bias the first piston 600a to disengage the first clutch 420a. The first piston 600a may include an axial channel 700 in the fourth member 630a for seating the first piston return spring 680 therein. The first piston return spring 680 may engage the annulus 690 for biasing the first piston 600b to disengage the first clutch 420a.

A second piston return spring 720 may be disposed axially between the second piston 600b and an annulus 730 fixed to the output shaft 230, wherein the annulus 730 may be positioned aft of the second piston 600b. The second piston return spring 720 may bias the second piston 600b to engage the second clutch 420b. In one embodiment, a rolling element bearing 740 may be disposed between the first intermediate output shaft 510a and output shaft 230.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transmission, including:
an input shaft configured to operationally connect to a low pressure section of a gas turbine engine; an output shaft configured to drive an engine aircraft accessory; a gear system connected between the input shaft and the output shaft, the gear system including: a first epicyclical gear set that includes a first ring gear coupled to the input shaft, a first sun gear, a first planetary gear set, and a first planetary carrier connected to the first planetary gear set; and a second epicyclical gear set that includes a second ring gear, a second sun gear, a second planetary gear set, and a second planetary carrier connected to the second planetary gear set,
wherein: the input shaft is coupled to the first ring gear and the second planetary carrier; and the first planetary carrier is coupled to the second ring gear; and a plurality of clutches that engage the first epicyclical gear set and the second epicyclical gear set, the plurality of clutches being adapted for shifting the transmission to generate a plurality of respectively overlapping transmission speeds;
wherein the plurality of clutches comprises one or more of:
a first clutch configured for being shifted between: a closed state, to rotationally couple the output shaft with the second sun gear; and an opened state to rotationally decouple the output shaft from the second sun gear;
a second clutch configured for being shifted between: a closed state to rotationally couple the output shaft with the second ring gear and the first planetary carrier; and an opened state to rotationally decouple the output shaft from the second ring gear and the first planetary carrier;
a third clutch configured for being shifted between: a closed state to rotationally brake the first sun gear; and an opened state to rotationally release from braking the first sun gear; and
a fourth clutch configured for being shifted between: a closed state to rotationally brake the second ring gear and the first planetary carrier; and an opened state to rotationally release from braking the second ring gear and the first planetary carrier;
wherein the plurality of transmission speeds includes one or more of:
a first transmission speed, wherein: the first clutch is in the closed state; the second clutch is in the opened state; the third clutch is in the opened state; and the fourth clutch is in the closed state;
a second transmission speed, wherein: the first clutch is in the closed state; the second clutch is in the opened state; the third clutch is in the closed state; and the fourth clutch is in the opened state;
a third transmission speed, wherein: the first clutch is in the closed state; the second clutch is in the closed state; the third clutch is in the opened state; and the fourth clutch is in the opened state; and
a fourth transmission speed, wherein: the first clutch is in the opened state; the second clutch is in the closed state; the third clutch is in the closed state; and the fourth clutch is in the opened state; and wherein:
the first transmission speed and the second transmission speed overlap by a first overlapping speed range;
the second transmission speed and the third transmission speed overlap by a second overlapping speed range that is broader than three times the first overlapping speed range; and
the third transmission speed and the fourth transmission speed overlap by a third overlapping speed range that is broader than five times the first overlapping speed range.

2. The transmission of claim 1, wherein:
the first transmission speed generates a first output/input speed ratio;
the second transmission speed generates a second output/input speed ratio that is less than sixty percent of the first output/input speed ratio;
the third transmission speed generates a third output/input speed ratio that is less than the second output/input speed ratio and less than forty percent of the first output/input ratio; and
the fourth transmission speed generates a fourth output/input speed ratio that is less than the third output/input speed ratio and less than thirty percent of the first output/input ratio.

3. The transmission of claim 1, further comprising:
a first spline that connects:
the first clutch to the second sun gear; and
the first clutch to the output shaft; and
a second spline that connects:
the second clutch to the second ring gear; and
the second clutch to the output shaft.

4. The transmission of claim 1, further comprising:
a first rotor coupled to the second sun gear, and the first rotor being a stub shaft that is:
axially aligned with the input shaft and the output shaft; and
axially intermediate the input shaft and the output shaft;
wherein the first clutch is coupled to the first rotor so that engaging the first clutch engages the first rotor;
a second rotor coupled to the first sun gear;
wherein the third clutch is a first band brake configured to engage the second rotor; and
the fourth clutch is a second band brake configured to engage the second ring gear.

5. A method of transmitting rotational speed, comprising:
providing a first epicyclical gear set that includes a first sun gear, a first ring gear surrounding the first sun gear, a first planetary gear set that mechanically couples the first sun gear to the first ring gear, and a first planetary carrier connected to the first planetary gear set; providing a second epicyclical gear set that includes a second sun gear, a second ring gear surrounding the second sun gear, a second planetary gear set that mechanically couples the second sun gear to the second ring gear, and a second planetary carrier connected to the second planetary gear set;
driving from an input shaft of a transmission: the first ring gear, thereby driving the first planetary gear set, and the first planetary carrier; and the second planetary carrier, thereby driving the second planetary gear set, and the second sun gear;
driving, from the first planetary carrier, the second ring gear; and
controlling a plurality of clutches in the transmission to engage the first epicyclical gear set and the second epicyclical gear set, thereby shifting the transmission between a plurality of transmission speeds that are respectively overlapping;

wherein controlling the plurality of clutches includes one or more of:

shifting a first clutch of the plurality of clutches between: a closed state, to rotationally couple an output shaft with the second sun gear; and an opened state to rotationally decouple the output shaft from the second sun gear;

shifting a second clutch of the plurality of clutches between: a closed state to rotationally couple the output shaft with the second ring gear and the first planetary carrier; and an opened state to rotationally decouple the output shaft from the second ring gear and the first planetary carrier;

shifting a third clutch of the plurality of clutches between: a closed state to rotationally brake the first sun gear; and an opened state to rotationally release from braking the first sun gear;

shifting a fourth clutch of the plurality of clutches between: a closed state to rotationally brake the second ring gear and the first planetary carrier; and an opened state to rotationally release from braking the second ring gear and the first planetary carrier;

wherein the method further comprises one or more of:

generating a first transmission speed of the plurality of transmission speeds by: shifting the first clutch to the closed state; shifting the second clutch to the opened state; shifting the third clutch to the opened state; and shifting the fourth clutch to the closed state;

generating a second transmission speed of the plurality of transmission speeds by: shifting the first clutch to the closed state; shifting the second clutch to the opened state; shifting the third clutch to the closed state; and shifting the fourth clutch to the opened state;

generating a third transmission speed of the plurality of transmission speeds by: shifting the first clutch to the closed state; shifting the second clutch to the closed state; shifting the third clutch to the opened state; and shifting the fourth clutch to the opened state;

generating a fourth transmission speed of the plurality of transmission speeds by: shifting the first clutch to the opened state; shifting the second clutch to the closed state; shifting the third clutch to the closed state; and shifting the fourth clutch to the opened state; and wherein:
the first transmission speed and the second transmission speed overlap by a first overlapping speed range;
the second transmission speed and the third transmission speed overlap by a second overlapping speed range that is broader than three times the first overlapping speed range; and
the third transmission speed and the fourth transmission speed overlap by a third overlapping speed range that is broader than five times the first overlapping speed range.

6. The method of claim 5, wherein:
the first transmission speed generates a first output/input speed ratio;
the second transmission speed generates a second output/input speed ratio that is less than sixty percent of the first output/input speed ratio;
the third transmission speed generates a third output/input speed ratio that is less than the second output/input speed ratio and less than forty percent of the first output/input ratio; and
the fourth transmission speed generates a fourth output/input speed ratio that is less than the third output/input speed ratio and less than thirty percent of the first output/input ratio.

7. The method of claim 5, wherein the transmission includes:
a first spline that connects:
the first clutch to the second sun gear; and
the first clutch to the output shaft; and
a second spline that connects:
the second clutch to the second ring gear; and
the second clutch to the output shaft.

8. The method of claim 5, wherein the transmission includes:
a first rotor coupled to the second sun gear, and the first rotor being a stub shaft that is:
axially aligned with the input shaft and the output shaft; and
axially intermediate the input shaft and the output shaft;
wherein the first clutch is coupled to the first rotor so that engaging the first clutch engages the first rotor;
a second rotor coupled to the first sun gear;
wherein the third clutch is a first band brake configured to engage the second rotor; and
the fourth clutch is a second band brake configured to engage the second ring gear.

* * * * *